March 19, 1946.  B. BOGOSLOWSKY  2,396,635
COLLAPSIBLE TUBE
Original Filed Jan. 23, 1943  2 Sheets-Sheet 1

INVENTOR
Boris Bogoslowsky
BY
Emery, Varney, Whittemore & Dix
ATTORNEYS

March 19, 1946.  B. BOGOSLOWSKY  2,396,635
COLLAPSIBLE TUBE
Original Filed Jan. 23, 1943  2 Sheets-Sheet 2
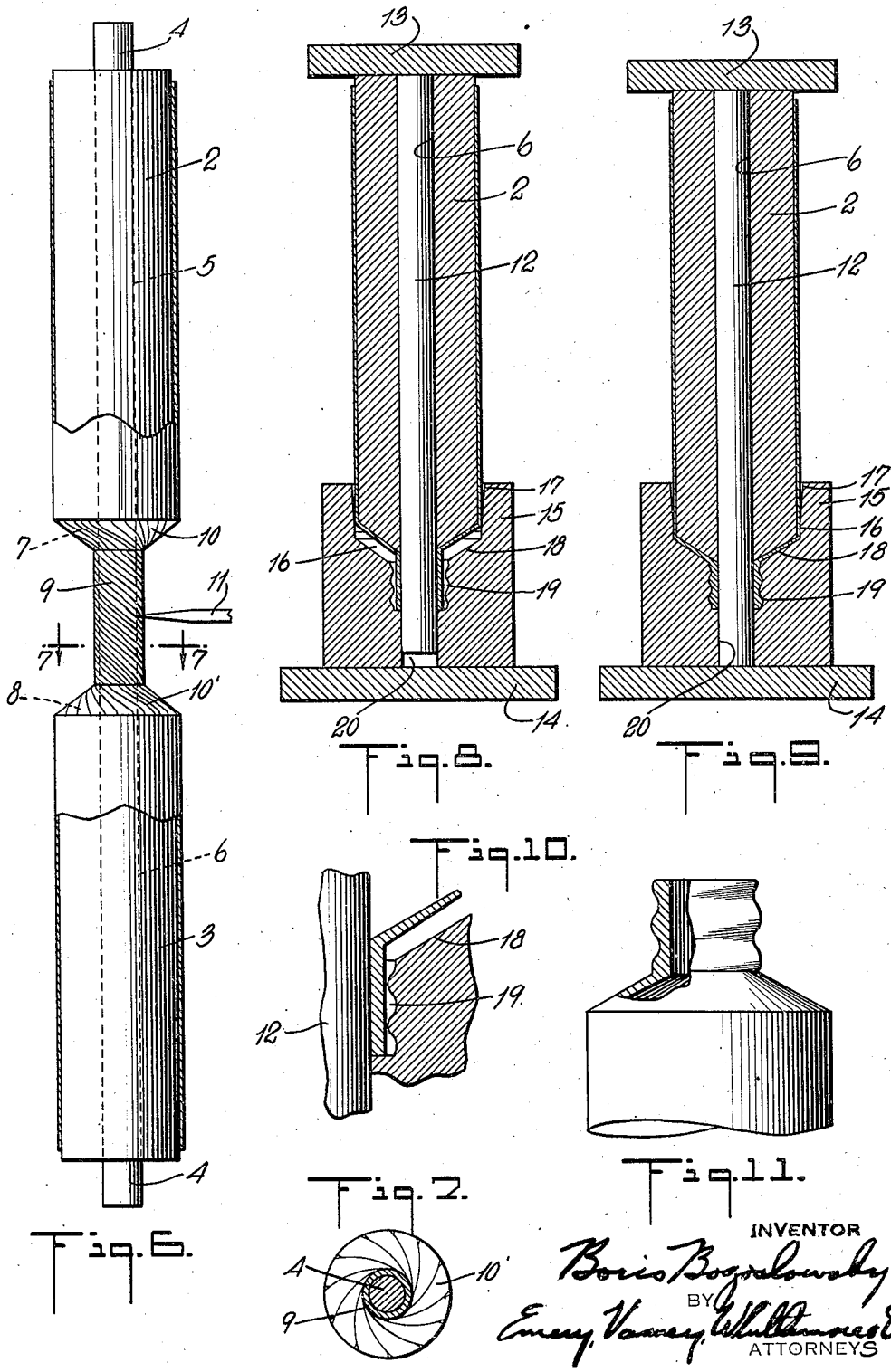

Patented Mar. 19, 1946

2,396,635

UNITED STATES PATENT OFFICE 2,396,635

COLLAPSIBLE TUBE

Boris Bogoslowsky, Jackson Heights, N. Y.

Original application January 23, 1943, Serial No. 473,322. Divided and this application December 1, 1943, Serial No. 512,457

2 Claims. (Cl. 222—107)

This invention relates to collapsible tubes and to methods for the manufacture thereof, and constitutes modifications of or improvements on the collapsible tubes and methods for the manufacture thereof disclosed in my copending application Serial No. 421,624, filed December 4, 1941.

This application is a division of my copending application Serial No. 473,322, filed January 23, 1943.

It is an object of the invention to provide a collapsible tube made of materials in sheet or film form as hereinafter described, as a substitute for the extruded metal collapsible tubes now in common use.

Other objects and advantages of the invention will appear hereinafter.

A preferred embodiment of the invention selected for purposes of illustration is shown in the accompanying drawings, in which, Figure 1 is a front elevation, partly in section, showing the mandrels in position to begin the forming operation.

Figure 6 is a front elevation showing the tubes on completion of the forming operation.

Figure 7 is a sectional view on the line 7—7 of Figure 6.

Figures 8 and 9 are sectional views showing the method of applying heat and pressure to re-form and compress the shoulder and neck.

Figure 10 is an enlarged detail sectional view of the same.

Figure 11 is a front elevation, partly in section of a finished tube.

Figures 1, 2, 3, 4, 5:
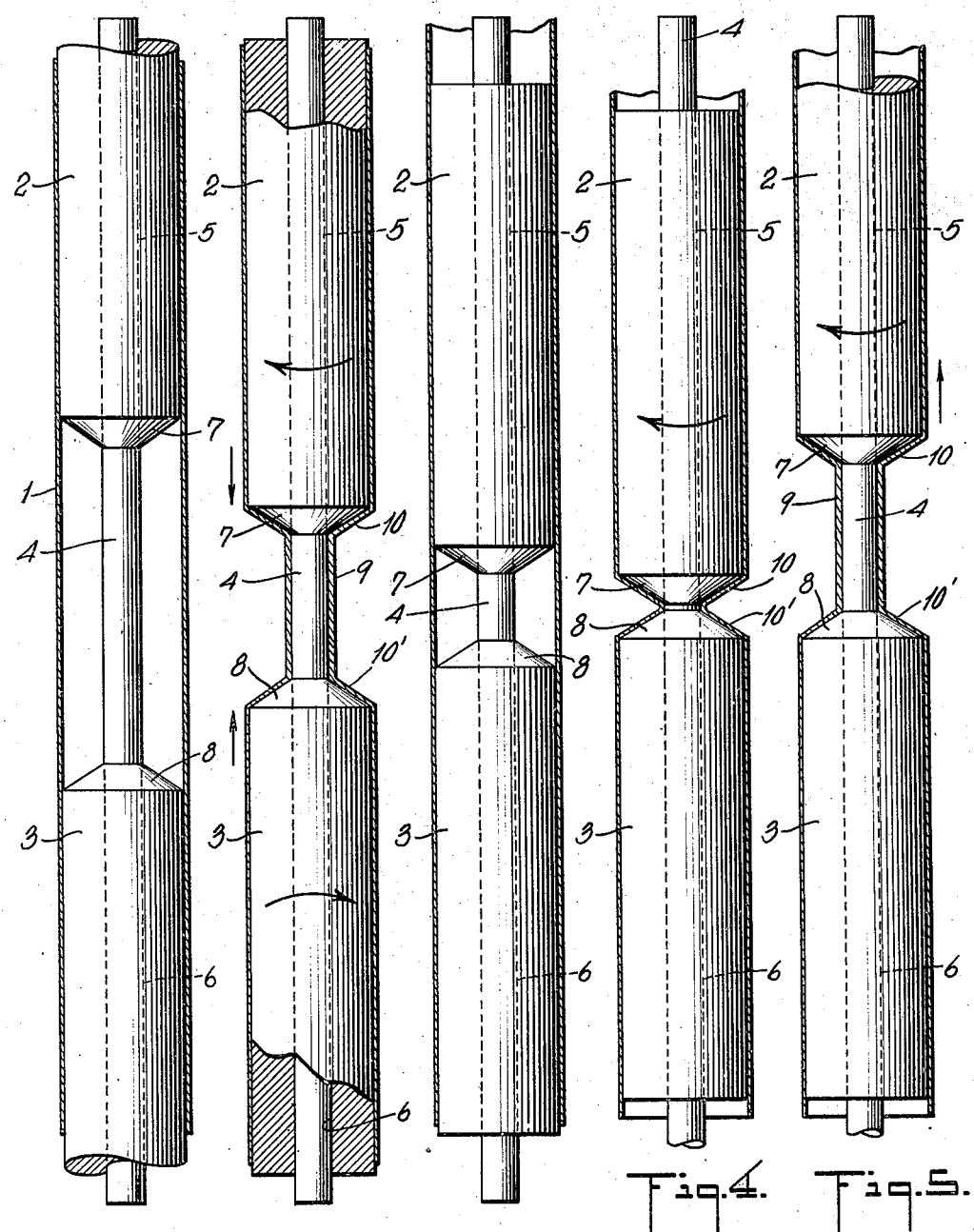
Figure 2 is a similar view showing a later stage in the forming operation.
Figures 3, 4 and 5 are similar views showing an alternative method of procedure.

As materials for use in the manufacture of collapsible tubes according to my invention, I may use many of the plastic films or sheets now available in the commercial market, as for example, the various cellulose base films such as the commercial product "Cellophane," or resin base films such as the commercial product "Vinylite," or rubber base films such as the commercial product "Pliofilm." Or I may use paper or other sheet materials for some purposes. The selection of a suitable material will depend entirely on the nature of the contents to be packaged in the tube formed therefrom, but I prefer to use material which is thermo-plastic or heat sealing for reasons which will be apparent hereinafter. If paper or other sheet materials which are not thermoplastic or heat sealing are used, such materials should preferably be coated or laminated with thermo-plastic or heat sealing materials.

In practicing the invention hereinafter described I prefer to start with the sheet or film material in the form of cylindrical tubular blanks cut to the desired length. It is possible to obtain some of the above-named plastic films or sheets in the form of seamless tubing, and I may employ such tubing in carrying out my invention. However, it is cheaper and for most purposes more satisfactory to form cylindrical tubular blanks from flat sheet or strip material, either by rolling the same and sealing the formed tube along a longitudinal seam, or by spiral winding and sealing the overlapping spiral edges. Suitable machinery for making such tubular blanks is obtainable and the formation of such tubular blanks forms no part of the present invention.

Such tubular blanks are preferably formed of more than a single ply of material, and may, if desired, be reinforced or stiffened by interposing a sheet of stiffening material of paper, metal foil or the like between successive plies. If the material of the tubular blank is of a transparent nature, a suitable label printed on the stiffening material will be visible through the tubular blank and serve the same purposes as the label now printed on the outside surface of metal collapsible tubes. Such stiffening material should preferably be of a length less than the length of the tubular blank, and at the upper end should not extend beyond the point at which the shoulder is to be formed as hereinafter described, for the formation of the shoulder can be accomplished to better advantage with unstiffened material. The purpose of the stiffening material is merely to stiffen the cylindrical wall of the finished tube.

Referring to Figures 1 and 2, according to the present invention I place such a tubular blank 1 of the selected material on a pair of spaced cylindrical mandrels 2 and 3, said mandrels being aligned axially by a co-axial spindle 4 extending into passages 5 and 6 through said mandrels. The said spindle should fit snugly in said passages, but at least one of said mandrels, and preferably both of said mandrels, should be permitted to rotate on said spindle and to slide longitudinally thereon.

After placing the blank on the mandrels as shown in Figure 1, with the opposed ends of the mandrels spaced apart a predetermined distance, as shown, the ends of the blank are clamped to the respective mandrels by any suitable means, and the mandrels are rotated relative to one another, i. e. one mandrel is rotated in clockwise direction and the other mandrel is rotated in counter-clockwise direction as indicated in Figure 2, or alternatively, one of the mandrels may be held stationary and the other mandrel rotated relatively thereto. Such relative rotation twists the unsupported portion of the tubular blank lying between the mandrels, causing the same to pucker inwardly toward the spindle, the mandrels being allowed to move axially toward each other as the twisting movement continues.

The twisting movement causes the unsupported material to form itself into a multiplicity of small spiral folds, and continued twisting movement causes the spirally folded material to wind itself tightly around the spindle 4 (Figure 2) and to lie tightly against the opposed end surfaces 7 and 8 of the mandrels, which in the preferred embodiment illustrated, are of conical form. Thus, as shown in Figures 6 and 7, the spiral folds begin at the periphery of one mandrel, for example, the mandrel 2, extend inwardly along the conical surfaces 7 with the fold lines extending in a direction tangent to the neck, then extend spirally around the spindle to the conical surface 8, and then extend outwardly along the conical surface 8 to the periphery of the other mandrel 3.

The tubular layer 9 of material which is spirally wound on the spindle, and which provides the material for the formation of the neck of the finished tube as hereinafter explained, is, due to such spiral winding, of a thickness greater than the wall thickness of the tubular blank, and the folded material 10, 10' which abuts the end surfaces of each of the mandrels, and which constitutes the shoulder of the finished tube, increases in thickness from the periphery of the blank to the point of juncture with the layer 9.

An alternative method of proceeding is shown in Figures 3, 4 and 5. In this use a tubular blank 1 is placed on the mandrels as before, but the mandrels, as shown in Figure 3, are more closely spaced than in Figure 1. Again, the mandrels are rotated relative to one another, but for convenience in the following description, it will be assumed that the lower mandrel 4 is held stationary and that the upper mandrel 3 is rotated relative thereto. In this case the tubular blank is clamped tightly to one mandrel, say the lower mandrel, but is not clamped tightly to the other mandrel, being merely held in such manner as to cause the upper end of the blank to rotate with the mandrel, while allowing the blank to creep longitudinally of the mandrel as hereinafter described. This may be done, for example, by using rollers (not shown) as the blank holding means.

After placing the blank on the mandrels, the upper mandrel is rotated to twist the unsupported portion of the blank to cause the same to pucker inwardly as shown in Figure 4, the upper mandrel being allowed to move toward the lower mandrel during this portion of the operation. On arriving at the position shown in Figure 4, and while continuing the rotation of the upper mandrel, the upper mandrel is backed away from the lower mandrel, while allowing the blank to creep longitudinally of the upper mandrel. In this manner the material is again twisted tightly around the spindle 4 as shown in Figure 5, and by controlling the rate at which the mandrel is backed away relative to the rate of rotation thereof, the thickness of the spirally wound layer 9 may be controlled, and in cases where a thicker layer may be desirable, it may be readily obtained in this manner.

Except for such variation in thickness, the result of both methods of procedure is identical, and as illustrated in Figure 6, consists in the formation of two embryo tubes in one operation, each consisting of a tubular body portion, a shoulder of spirally folded material, and an elongated neck of tightly twisted spirally wound material, all of said parts being formed integrally from a single tubular blank. The next step, therefore, is to sever the two tubes by cutting through the neck portion near the middle thereof in any suitable manner, as by the knife 11.

The elongated common spindle 4 is now removed from the mandrels, and a shorter spindle 12 is inserted in each mandrel for purposes hereinafter described. A mandrel, as for example the mandrel 2, carrying an embryo tube is then inserted in a press having opposed plates 13 and 14, one of said plates carrying a die 15 having a cavity 16 therein. The said cavity has slightly tapering walls 17 and has a conical surface 18 adapted to cooperate with the conical end surface of the mandrel to form the shoulder of the tube. At the bottom of the cavity 16 is a smaller cavity 19 adapted to receive the neck of the tube, said cavity having a threaded wall adapted to form a thread on the neck of the finished tube. There is also a passage 20 through the die into which the spindle 12 is fitted. The die 15 is heated in any suitable manner, as by a suitable electrical heating element or by steam, with provision for temperature control at the required level for sealing the selected material.

When the mandrel is inserted in the press as shown in Figure 8, the outside diameter of the neck is less than the inside diameter of the threaded cavity 19, but the length of the neck is greater than the depth of the cavity. Thus, when pressure is applied, as shown in Figure 9, the material in the neck is reformed under the influence of heat and pressure, and is compressed to provide a shortened, but thickened, threaded neck as shown in Figures 9 and 11. At the same time, the folds of the shoulder are subjected to heat and pressure, the spindle 12 serving, however, as a limit stop to prevent application of excessive pressure thereto. In order to provide adequate strength, the thickening of the neck should be substantial, i. e. in the finished tube the wall thickness of the neck should be at least twice the wall thickness of the tubular body portion of the tube. The application of heat and pressure, of course, not only reforms the neck, but seals the overlapping folds of the neck and shoulder, and in effect, welds them together to provide increased strength and stiffness in the finished tube. Particularly the neck assumes a strength and rigidity approaching that of metals such as tin. After the pressure is released, the tube is removed from the die by unscrewing the same, this being necessary because of the interengaging threads of the tube and die cavity.

The resulting tube is admirably suited for use as a collapsible tube, for the cylindrical wall is thin and flexible, while the shoulder, due to the folds which provide increasing thickness from the periphery to the juncture with the neck, and due to the application of heat and pressure, possesses sufficient rigidity to hold its shape under ordinary usage. Finally, the thickened tubular neck as reformed and compressed possesses substantial strength and rigidity, and when provided with a thread as illustrated, is adapted to receive the ordinary threaded cap as ordinarily used as a closure for metal collapsible tubes.

It will be understood that the invention may be variously modified and embodied within the scope of the subjoined claims.

I claim as my invention:

1. A collapsible tube of sheet material, comprising, a flexible cylindrical tubular portion, and an integral shoulder and neck, all formed from a single tubular blank, said shoulder extending inwardly from said tubular portion and consisting of a multiplicity of small folds, said neck being tubular and consisting of twisted folds forming continuations of the folds of said shoulder and terminating at the end of said neck, said twisted folds of the neck being compressed to form a shortened, thickened tubular wall of substantial strength and rigidity.

2. A collapsible tube of sheet material, comprising, a flexible cylindrical tubular portion, and an integral shoulder and neck, all formed from a single tubular blank, said shoulder extending inwardly from said tubular portion and consisting of a multiplicity of small folds, said neck being tubular and consisting of a length of twisted folds forming continuations of the folds of said shoulder and terminating at the end of said neck, which said length of twisted folds has been shortened to provide a compressed, thickened tubular wall of substantial strength and rigidity.

BORIS BOGOSLOWSKY.